US009778366B2

(12) United States Patent
Krulwich (10) Patent No.: US 9,778,366 B2
(45) Date of Patent: Oct. 3, 2017

(54) RELATIVE GPS DATA REFINEMENT

(71) Applicant: Empire Technology Development LLC, Wilmington, DE (US)

(72) Inventor: Bruce Krulwich, Beit Shemesh (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 421 days.

(21) Appl. No.: 14/378,184

(22) PCT Filed: Jan. 22, 2014

(86) PCT No.: PCT/US2014/012504
§ 371 (c)(1),
(2) Date: Aug. 12, 2014

(87) PCT Pub. No.: WO2015/112133
PCT Pub. Date: Jul. 30, 2015

(65) Prior Publication Data
US 2015/0355336 A1 Dec. 10, 2015

(51) Int. Cl.
*G01S 19/13* (2010.01)
*G01S 5/02* (2010.01)
(Continued)

(52) U.S. Cl.
CPC ............ *G01S 19/13* (2013.01); *G01S 5/0236* (2013.01); *G08G 1/0112* (2013.01); *G08G 1/0129* (2013.01); *G08G 1/20* (2013.01)

(58) Field of Classification Search
CPC ........ G01S 5/02; G01S 5/0205; G01S 5/0236; G01S 19/01; G01S 19/13; G08G 1/01;
(Continued)

(56) References Cited

U.S. PATENT DOCUMENTS 5,781,150 A 7/1998 Norris
7,295,682 B2 11/2007 Otsuka et al.
(Continued)

FOREIGN PATENT DOCUMENTS

CN 202385159 U 8/2012
WO 2012112877 A1 8/2012
(Continued)

OTHER PUBLICATIONS

International Search Report and Written Opinion for International Application No. PCT/US2014/012504 mailed on May 14, 2014.

*Primary Examiner* — Bernarr Gregory
(74) *Attorney, Agent, or Firm* — Brundidge & Stanger, P.C.

(57) ABSTRACT

In some examples, a system to produce refined location information for multiple vehicles may aggregate GPS coordinates collected from each of multiple devices over a period of time, estimate a location for each of the multiple devices at intervals during the period of time, track the locations for each of the multiple devices over the period of time, and determine a current location, on a road, of the vehicle corresponding to each of the devices based on a detected trend of the tracked locations for each of the multiple devices over the period of time.

15 Claims, 4 Drawing Sheets

(51) Int. Cl.
*G08G 1/01* (2006.01)
*G08G 1/00* (2006.01)
*G01S 19/00* (2010.01)

(58) Field of Classification Search
CPC .. G08G 1/0104; G08G 1/0108; G08G 1/0112; G08G 1/0125; G08G 1/0129; G08G 1/20
See application file for complete search history.

(56) References Cited

U.S. PATENT DOCUMENTS

| | | |
|---|---|---|
| 7,970,529 B2 | 6/2011 | Mori et al. |
| 8,433,100 B2 | 4/2013 | Nakamori et al. |
| 8,725,396 B2 * | 5/2014 | Gueziec ............... G08G 1/0112 701/117 |
| 2008/0154502 A1 | 6/2008 | Tekawy et al. |
| 2012/0112959 A1 | 5/2012 | Richard |
| 2012/0296559 A1 | 11/2012 | Gueziec et al. |
| 2013/0152215 A1 | 6/2013 | Khosravy et al. |
| 2013/0176169 A1 | 7/2013 | Harmon et al. |
| 2013/0211660 A1 * | 8/2013 | Mitchell ................ G08G 1/20 701/29.3 |
| 2013/0278443 A1 | 10/2013 | Rubin et al. |

FOREIGN PATENT DOCUMENTS

| | | | |
|---|---|---|---|
| WO | WO2013/064437 A1 * | 5/2013 | ............... G08G 1/20 |
| WO | 2013079485 A1 | 6/2013 | |

* cited by examiner

RELATIVE GPS DATA REFINEMENT

CROSS-REFERENCE TO RELATED APPLICATION

This Application is a U.S. National Stage filing under 35 U.S.C. §371 of International Application No. PCT/US14/12504 filed on Jan. 22, 2014.

TECHNICAL FIELD

The embodiments described herein pertain generally to leveraging aggregated GPS data to estimate relative locations of vehicles and/or devices.

BACKGROUND

Unless otherwise indicated herein, the approaches described in this section are not prior art to the claims in this application and are not admitted to be prior art by inclusion in this section.

Global Positioning System (GPS) navigation systems are becoming ubiquitous. Though these navigation systems were originally designed and implemented for military use, such systems are now rely upon every day in virtually every facet of everyday transportation. Not only are GPS systems rely upon by military transport, they are also rely upon by, for example, interstate commerce truckers, taxicab drivers, and even parents transporting their children to afterschool activities. Accordingly, GPS systems are rely upon to provide navigational guidance, even on a turn-by-turn basis.

SUMMARY

In one example embodiment, a system to produce refined location information for multiple vehicles may include: multiple devices, disposed with respectively corresponding vehicles, each configured to record GPS coordinates at multiple intervals over a period of time; and a server configured to: aggregate GPS coordinates collected from each of multiple devices over the period of time, estimate a location for each of the multiple devices at intervals during the period of time, track the locations for each of the multiple devices over the period of time, and determine a current location, on a road, of the vehicle corresponding to each of the devices based on a detected trend of the tracked locations for each of the multiple devices over the period of time.

In another example embodiment, a method of location refinement may include: aggregating data pertaining to each of multiple devices that are proximately located relative to each other, over a period of time; estimating a location for each of the multiple devices at intervals during the period of time; and determining a current location for each of the devices based on a trend of the estimated locations for each of the multiple devices over the period of time.

In yet another example embodiment, a method of location refinement may include: aggregating data pertaining to each of multiple devices that are proximately located relative to each other, over a period of time; estimating a location for each of the multiple devices at intervals during the period of time; and determining a current location for each of the devices based on a trend of the estimated locations for each of the multiple devices over the period of time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
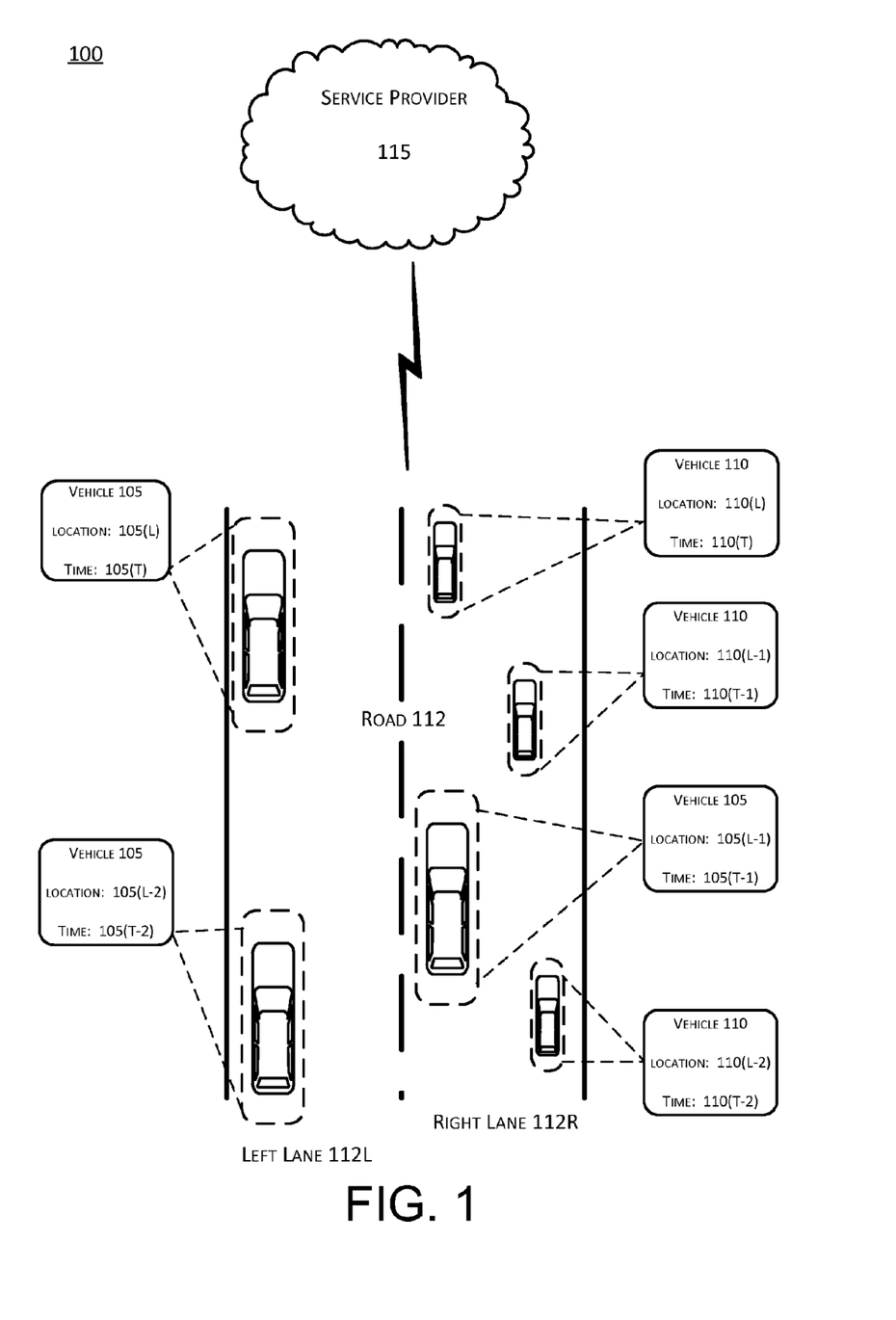
FIG. 1 shows an example configuration of a system in which refinement of relative GPS data may be implemented, arranged in accordance with at least some embodiments described herein.

FIG. 1 shows an example configuration of a system 100 in which refinement of relative GPS data may be implemented, arranged in accordance with at least some embodiments described herein. FIG. 1 depicts respective locations or positions of a vehicle 105 and a vehicle 110 traveling on a road 112 at various intervals or instances over a period of time. For example, vehicle 105 is shown at location 105(L-2) at time 105(T-2), at location 105(L-1) at time 105(T-1), and at location 105(L) at time 105(T); and vehicle 110 is shown at location 110(L-2) at time 110(T-2), at location 110(L-1) at time 110(T-1); and at location 110(L) at time 110(T). In some examples, at least one of the vehicles may be moving, e.g., currently being driven. In other examples, one or more of the vehicles may be stationary, e.g., stalled in either left lane 112L or right lane 112R or parked on a left or right shoulder of road 112.

Vehicle 105 and vehicle 110 may, respectively, refer to vehicles that are proximately located to each other on road 112 over a given period of time. Service provider 115 may aggregate GPS data for each of vehicle 105 and vehicle 110. Based on the aggregated GPS data, service provider 115 may further determine and/or estimate a location or position for the respective vehicles, relative to each other and relative to individual lanes of road 112.

Refinement of relative GPS data is in no way limited to determining relative locations or positions of just two vehicles. Rather, the embodiments described herein pertain to a location or position for the respective vehicles, relative to each other and relative to the lanes of the road, which may affect each other as traffic progresses. Thus, a quantity of vehicles to which a respective embodiment may apply may be limited only by traffic constraints of road 112.

In the example embodiments described herein, one or more of vehicle 105 and vehicle 110 may be equipped with a built-in GPS device. Alternatively, one or more of vehicle 105 and vehicle 110 may have provided therein a client-based GPS device in the form of, e.g., a separate GPS device; or a smart-phone, tablet computer, laptop computer, etc., that executes an instance of a GPS application. Regardless of the physical configuration by which either of vehicle 105 and vehicle 110 is equipped or provided with a GPS device, the GPS device may be configured to exploit connections to multiple GPS satellites to thereby deduce its respective current location based on trilateration, using known GPS technologies. Further, the ensuing description may alternately refer to a vehicle or GPS device when referring to a source of GPS data for vehicle 105, vehicle 110, etc, unless context requires a specific reference.

GPS location data for each of vehicle 105 and vehicle 110 may be transmitted to service provider 115 at regular time intervals. Alternatively, GPS location data for each of vehicle 105 and vehicle 110 may be periodically or randomly transmitted to service provider 115 at various times based on factors including, but not limited to, current traffic conditions, current weather conditions, current vehicle speed, a frequency of user access to the GPS location data, etc.

Road 112 may refer to any road, street, highway, thoroughfare, etc., on which, at least, vehicle 105 and vehicle 110 are proximately located. The embodiments described herein may be applicable to determine relative locations of vehicle 105, vehicle 110, and any other proximately located vehicles, relative to each other on road 112 and relative to the individual lanes of road 112. That is, not only may the relative locations of vehicle 105 and vehicle 110 be determined, but the relative locations of either vehicle with regard to left lane 112L and right lane 112R of road 112 may be determined as well. Further, just as the quantity of vehicles to which an embodiment may apply may be limited only by traffic constraints of road 112, neither is the number of lanes on road 112 so limited.

Service provider 115 may refer to a service provider to which a GPS device corresponding to at least one of vehicle 105 and vehicle 110 is registered. Further, service provider 115 may host one or more servers to refine relative GPS data for at least vehicle 105 and vehicle 110, relative to each other. Non-limiting examples of service provider 115 may include: internet service providers (ISPs) that host mapping applications, e.g., MICROSOFT®, a trademark of Microsoft Corporation for computer operating software, GOOGLE®, a trademark of Google Inc. Corporation for downloadable software for creating indexes of information, YAHOO!®, a trademark of Yahoo! Inc. Corporation for computer services; telecommunications service providers that provide wireless communications services, e.g., Verizon√®, a trademark of Verizon Trademark Services LLC for telecommunications software services, T-Mobile®, a trademark of Deutsche Telekom for wireless communication services, AT&T®, a trademark of AT&T Intellectual Property Inc. for telecommunication services; smartphone manufacturers through which applications may be disseminated to users, e.g., Apple®, a trademark of Apple Inc. Corporation for computers, Samsung®, a trademark of Samsung Electronics Co for wireless communication devices, Blackberry®, a trademark of Blackberry Limited Corporation for mobile phones; GPS device manufacturers, e.g., Garmin®, a trademark of Garmin Ltd. Corporation for satellite navigation systems, Magellan®, a trademark of MiTAC Digital Corporation for GPS devices, TomTom®, a trademark of TomTom International B.V. LLC for GPS devices; or other municipal or private third-party entities that may provide may provide navigational services to a driver or vehicle operator, e.g., local departments of transportation (DOT), etc.

In order to provide refined GPS data relative to other vehicles on a common road, service provider may aggregate GPS data corresponding to both vehicle 105 and vehicle 110 on road 112. Thus, embodiments described herein contemplate GPS data corresponding to each of vehicle 105 and vehicle 110 being received and aggregated by one or more servers corresponding to service provider 115.

Service provider 115 may include one or more servers that may be configured to aggregate GPS data from at least vehicle 105 and vehicle 110, and provide pertinent refined GPS data for each vehicle when the vehicles are proximately located to each other on road 112. Service provider 115 may then determine and/or estimate a relative location for each vehicle at periodic time intervals. In accordance with at least one example, the one or more servers may be configured to collect data for vehicles on road 112; determine location trends for each of the vehicles; and provide refined GPS data for each vehicle.

As referenced herein, the aggregation of GPS data for respective vehicles may refer to the collection of the GPS coordinates for the respective vehicles at periodic intervals or at various times. For the embodiments described herein, the aggregation may occur over a period of time that vehicles 105 and 110 are proximately located to each other. The vehicles may be regarded as being proximately located when the vehicles are relatively located on road 112 so as to potentially affect the safety and/or performance of both the respective vehicle and the other vehicle.

Further, as referenced herein, location trends for each of the vehicles may refer to estimates of the location of a respective vehicle on road 112, relative to other vehicles, over a period of time. Thus, location trends may be utilized herein in terms of one vehicle being located in front of another vehicle, one vehicle being located behind another vehicle, one vehicle being to the left of another vehicle, or one vehicle being located to the right of another vehicle, all at a periodic time interval or at a random time.

Further still, as referenced herein, refined GPS data for a respective vehicle may include location information for the vehicle on a particular road, location information for the vehicle relative to surrounding vehicles, and location information relative to individual lanes of road 112. The refined GPS data may be determined based on relative comparisons of the location trends for each of the vehicles. As referenced herein, a surrounding vehicle may be regarded as another vehicle that may have a potential to affect the safety and/or performance of a respective vehicle.

In system 100, service provider 115 may aggregate GPS data for, at least, vehicle 105 and vehicle 110; determine location trends for the respective vehicles; compare an aggregate of the location trends for the respective vehicles over a period of time; and provide refined GPS data for the respective vehicles. The refined GPS data may include, for example, navigational data on a lane-by-lane basis for, at least, vehicle 105 and vehicle 110.

Figure 2:
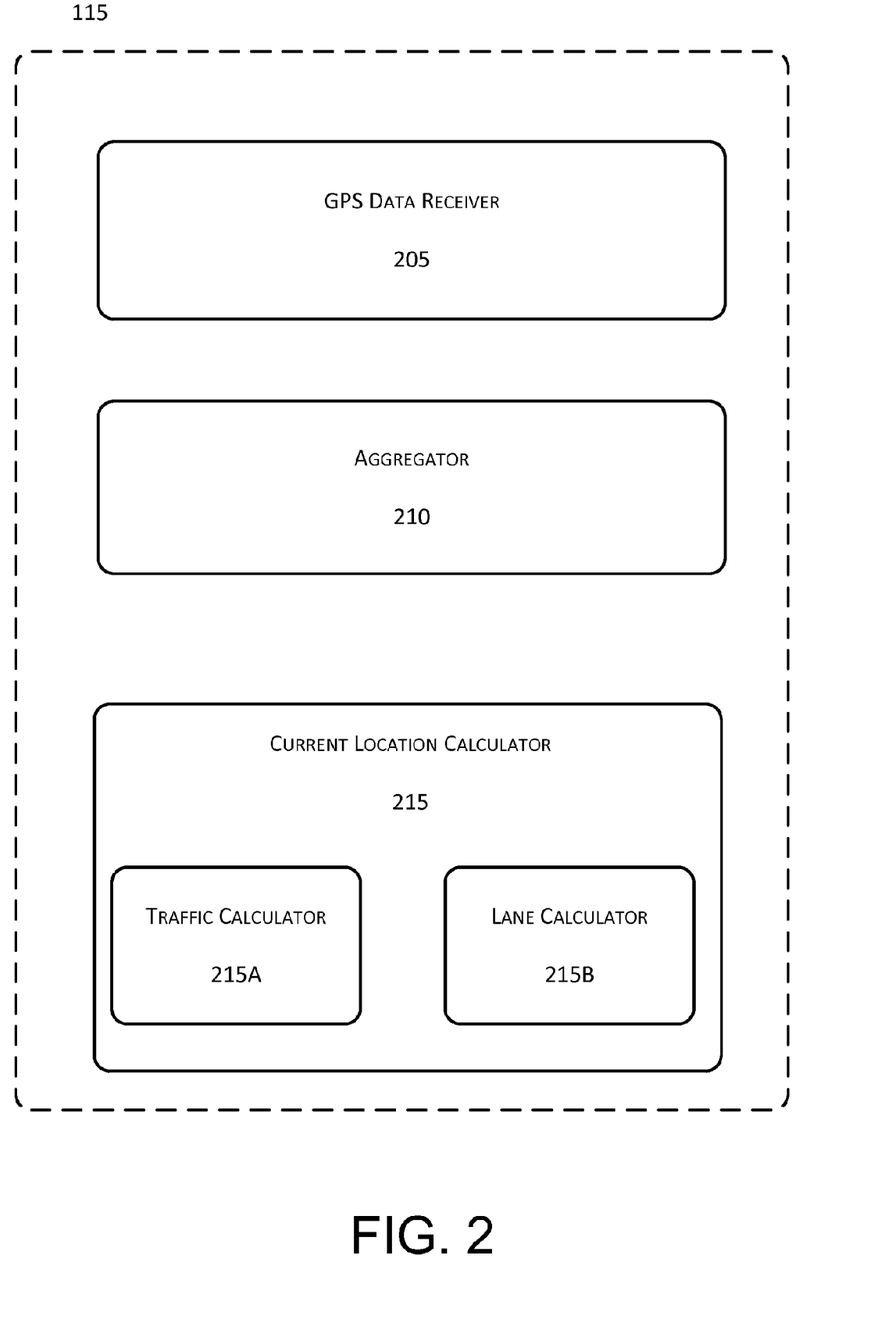
FIG. 2 shows an example configuration of a service provider by which relative GPS data may be refined, arranged in accordance with at least some embodiments described herein.

FIG. 2 shows an example configuration of a service provider 115 by which relative GPS data may be refined, arranged in accordance with at least some embodiments described herein. Service provider 115 may be embodied by one or more servers. As depicted, service provider 115 may include, at least, GPS a data receiver 205, an aggregator 210, and a current location calculator 215. Current location calculator 215 may include, at least, a traffic calculator 215A and a lane calculator 215B. GPS data receiver 205, aggregator 210, and current location calculator 215 may, respectively, be implemented as a hardware device, as software, as firmware, or any combination thereof.

GPS data receiver 205 may be configured, designed, and/or programmed to receive GPS data from the GPS device respectively corresponding to each of vehicle 105 and vehicle 110 at periodic time intervals or at random times. Both the periodic time intervals and the random times at which GPS data is received from each of vehicle 105 and vehicle 110 may or may not be in synchronism with each other. In addition, or alternatively, GPS data receiver 205 may receive GPS data corresponding to vehicle 105 and vehicle 110 at random times based on various factors including, but not limited to, current traffic conditions, current weather conditions, current vehicle speed, a frequency of user access to the GPS location data, etc. As referenced herein, the GPS data received by GPS data receiver 205 may include geometric location coordinates, e.g., "x" and "y" values, at a given point in time for each of vehicle 105 and vehicle 110.

As referenced herein, GPS data receiver 205 may receive GPS data from a GPS device in either of a push or pull manner. In a push configuration, a GPS device corresponding to a vehicle may be configured to transmit GPS data to service provider 115 at periodic time intervals and/or at random times based upon current traffic conditions, current weather conditions, current vehicle speed, a frequency of user access to the GPS location data, etc. In a pull configuration, service provider 115 may request that a GPS device corresponding to a vehicle transmit GPS data to service provider at the aforementioned periodic time intervals and/or random times.

FIG. 1 shows a non-limiting example of GPS data receiver 205 receiving GPS data. In the example, three recent transmissions of GPS data corresponding to vehicle 105, received by GPS data receiver 205, may include: vehicle 105 at location 105(L-2) at time 105(T-2); vehicle 105 at location 105(L-1) at time 105(T-1); and vehicle 105 at location 105(L) at time 105(T). Similarly, three most recent transmissions of GPS data corresponding to vehicle 110, received by GPS data receiver 205, may include: vehicle 110 at location 110(L-2) at time 110(T-2); vehicle 110 at location 110(L-1) at time 110(T-1); and vehicle 110 at location 110(L) at time 110(T). The foregoing transmissions of GPS data may be implemented in either a push or pull manner.

Aggregator 210 may be configured, designed, and/or programmed to aggregate the aforementioned GPS data received from the GPS device corresponding to vehicle 105 and vehicle 110, respectively.

For example, aggregator 210 may collect GPS data from multiple vehicles, including vehicle 105 and vehicle 110; identify the vehicle or GPS device from which respective GPS data is collected, based on metadata, MAC addresses, or using other known means or methodologies of associating collected data with a corresponding originating device; and collate the collected GPS data, that is, ordering the collected GPS data according to its source.

Aggregator 210 may collect and retain GPS data for vehicle 105 and vehicle 110 at periodic intervals or at random times on a rolling basis. That is, aggregator 210 may retain the collected GPS data corresponding for each vehicle over a rolling basis that includes a number of most recent GPS transmissions from the respective GPS devices. For example, aggregator 210 may retain the, e.g., three (3), most recent GPS data transmissions received from the respective GPS devices corresponding to each of vehicle 105 and vehicle 110. As another example, aggregator 210 may retain GPS data corresponding to each of vehicle 105 and vehicle 110 that has been received at periodic intervals or at random times over a period of time, e.g., the most recent seven (7) seconds, on a rolling basis. The number of collected and retained GPS data transmissions may or may not be predetermined, and the values used in the foregoing description are provided only as examples.

Current location calculator 215 may be configured, designed, and/or programmed to determine and/or estimate a real-time current location for each of vehicle 105 and vehicle 110, relative to each other and relative to individual lanes of road 112, by calculating an average of the plotted or tracked location of each vehicle.

For example, current location calculator may calculate an average GPS location for each of vehicle 105 and vehicle 110, based on the collected and collated GPS data, received over a period of time. As stated previously, the GPS data includes x and y coordinates of a vehicle's location at a given point in time. The average GPS location may be calculated by averaging the respective x and y coordinates over the period of time. Further to the example, referring to FIG. 1, the average GPS location for vehicle 105 may be calculated by averaging the x and y coordinates at location 105(L-2) at time 105(T-2), at location 105(L-1) at time 105(T-1), and at location 105(L) at time 105(T). Similarly, the average GPS location for vehicle 110 may be calculated by averaging the x and y coordinates at location 110(L-2) at time 110(T-2), at location 110(L-1) at time 110(T-1); and at location 110(L) at time 110(T).

Based on the calculated average GPS location for the vehicles, current location calculator 215 may reveal trends for a driving progression for each of vehicle 105 and vehicle 110. As stated earlier, location trends for each of the vehicles may refer to estimates of the location of a respective vehicle on road 112, relative to other vehicles, over a period of time. Thus, location trends may reveal that, over a period of time, one vehicle being located in front of another vehicle, one vehicle being behind another vehicle, one vehicle being to the left of another vehicle, or one vehicle being to the right of another vehicle.

For example, if vehicle 105 is determined to be behind vehicle 110 on road 112 at a first point in time, but is determined to be in front of vehicle 110 several seconds later, it would appear that vehicle 105 passed vehicle 110 on road 112. When vehicle 105 passes vehicle 110, the two vehicles were clearly in different lanes of road 112. In that case, the average location of vehicle 105 over the several seconds may reveal a location trend that vehicle 105 was located to the left of vehicle 110.

As another example, if the collected GPS data for vehicle 105 and vehicle 110 appears to be substantially overlapping, with vehicle 105 consistently behind vehicle 110, the average location of vehicle 105 over the several seconds may reveal a location trend that vehicle 105 was located in the same lane but behind vehicle 110.

Traffic calculator 215A may be configured, designed, and/or programmed to determine and/or estimate a real-time location of each of vehicle 105 and vehicle 110, relative to each other on road 112, based on the average GPS location of vehicle 105 and vehicle 110 as well as the respective trends.

Lane calculator 215B may be configured, designed, and/or programmed to determine and/or estimate a real-time location of each of vehicle 105 and vehicle 110, relative to left lane 112L and right lane 112R on road 112, based on the average GPS location of vehicle 105 and vehicle 110 as well as the respective trends.

Alternative embodiments may apply to providing refined location data in non-traffic environments, e.g., in a building, warehouse, etc, in which users may be equipped with client devices, e.g., smart phones. Service provider 115 and, more particularly, server 120 may be implemented as an internet access point. Further, instead of GPS data, a service provider may receive, e.g., IP addresses for each of the client devices. Accordingly, data pertaining to each of multiple devices that may be proximately located relative to each other may be aggregated over a period of time. Then, a location for each of the multiple devices may be estimated at intervals within the period of time, and a current location for each of the devices may be determined and/or estimated based on a trend of the estimated locations for the respective devices. Thus, the determined location of the devices may be refined, relative to each other by comparison.

Figure 3:
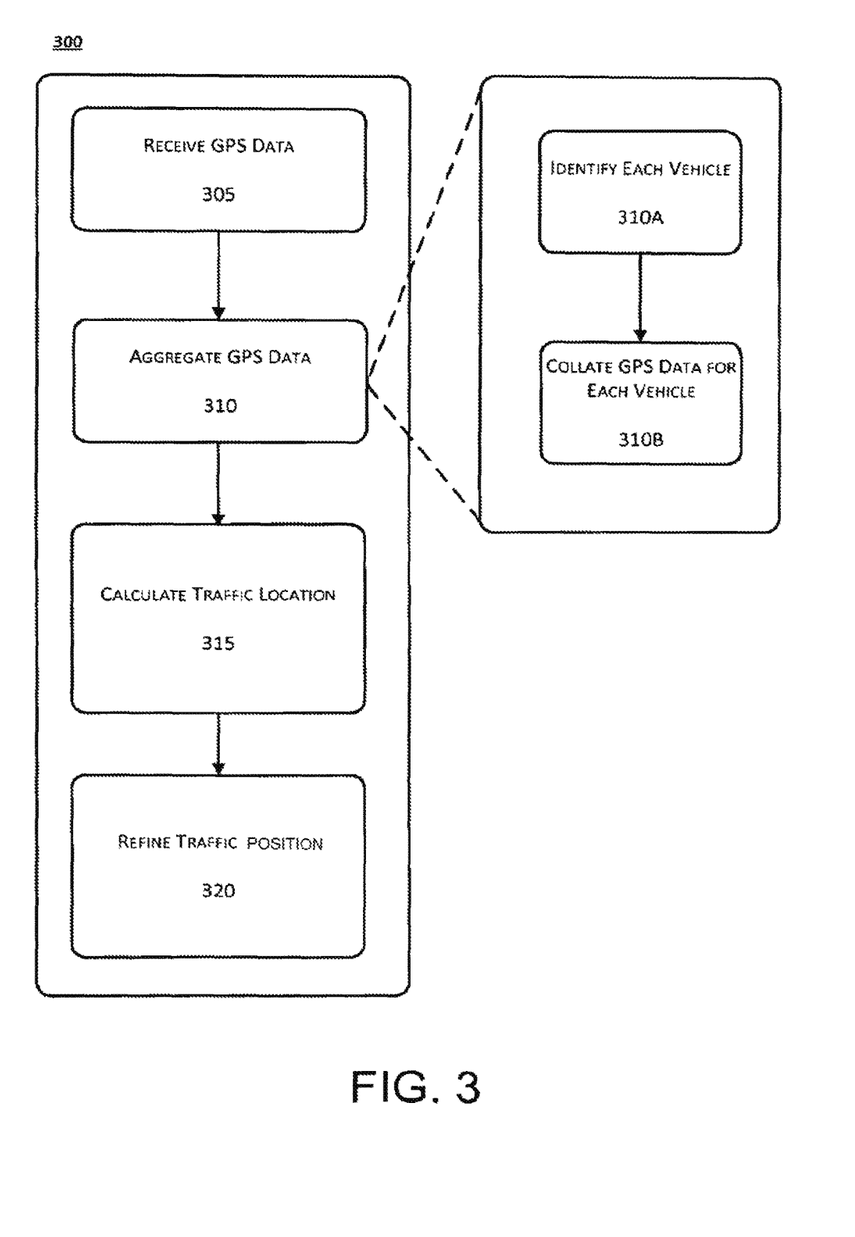
FIG. 3 shows an example processing flow by which relative GPS data may be refined, arranged in accordance with at least some embodiments described herein.

FIG. 3 shows an example processing flow 300 by which relative GPS data may be refined, arranged in accordance with at least some embodiments described herein. Processing flow 300 may be implemented by service provider 115. Processing flow 300 may include one or more operations, actions, or functions depicted by one or more blocks 305, 310, 315, and 320. Although illustrated as discrete blocks, various blocks may be divided into additional blocks, combined into fewer blocks, or eliminated, depending on the desired implementation. As a non-limiting example, the description of processing flow 300, corresponding to the depiction thereof in FIG. 3, pertains to refining GPS data for vehicle 105 and vehicle 110, relative to each other and individual lanes of road 112. Processing may begin at block 305.

Block 305 (Receive GPS Data) may refer to GPS data receiver 205 receiving GPS data from the GPS devices respectively corresponding to each of vehicle 105 and vehicle 110 at periodic intervals, which may or may not be in synchronism with each other. Additionally, or alternatively, block 305 may refer to GPS data receiver 205 receiving GPS data from each of vehicle 105 and vehicle 110 at random times based on various factors including, but not limited to, current traffic conditions, current weather conditions, current vehicle speed, a frequency of user access to the GPS location data, etc. Block 305 may be followed by block 310.

Block 310 (Aggregate GPS Data) may refer to aggregator 210 aggregating the GPS data received from the GPS devices respectively corresponding to vehicle 105 and vehicle 110. In some examples, block 310 may refer to aggregator 210 collecting and retaining GPS data on a rolling basis that may include a number of most recent GPS transmissions from the respective GPS devices or most recent GPS data transmissions received over a period of time. Block 310 may include sub-blocks 310A and 310B.

Sub-block 310A may refer to aggregator 210 identifying the vehicle or GPS device from which respective GPS data is collected. The vehicle or GPS device may be identified by metadata that accompanies the collected GPS data, a MAC address corresponding to the vehicle or GPS device, or other known means and methodologies of associating collected data with a corresponding originating device. Sub-block 310A may be followed by sub-block 310B.

Sub-block 310B may refer to aggregator 210 collating the collected GPS data. That is, aggregator 210 may order the collected GPS data according to its source vehicle or GPS device. Block 310 may be followed by block 315.

Block 315 (Calculate Traffic Location) may refer to current location calculator 215 tracking a location of each vehicle on road 112, based on the collected and collated GPS data. Using the GPS data for the respective vehicles, current location calculator 215 may determine location trends for each vehicle. Current location calculator 215 may plot or track the aggregated geographic "x" and "y" coordinates of each of vehicle 105 and vehicle 110 on road 112 to determine and reveal movement trends of the respective vehicles. Block 315 may further refer to current location calculator 215 determining and/or estimating a real-time current location for each of vehicle 105 and vehicle 110 relative to each other on road 112; and lane calculator 215B determining and/or estimating a location of each of vehicle 105 and vehicle 110 in real-time, relative to left lane 112L and right lane 112R on road 112. Block 315 may be followed by decision block 320.

Block 320 (Refine Traffic Position) may refer to server 120 determining and/or estimating a real-time location for each of vehicle 105 and vehicle 110, relative to left lane 112L and right lane 112R on road 112. Block 320 may additionally refer to service provider transmitting the calculated real-time traffic location to vehicle 110, relative to vehicle 105 and relative to left lane 112L and right lane 112R on road 112. Thus, block 320 may further include mapping the relative refined locations of vehicle 105 and vehicle 110 to facilitate better informed navigation by a driver of the respective vehicles.

Accordingly, processing 300, as implemented by various modules or components of server 120, may provide refined GPS data for respective vehicles on a common road. Such refined GPS data may provide respective vehicles with navigational guidance that goes beyond turn-by-turn guidance. For example, such navigational guidance may provide a driver with guidance on a lane-by-lane basis. Therefore, example embodiments may be applied to collision avoidance, automatic navigation, and even hands-free driving.

Figure 4:
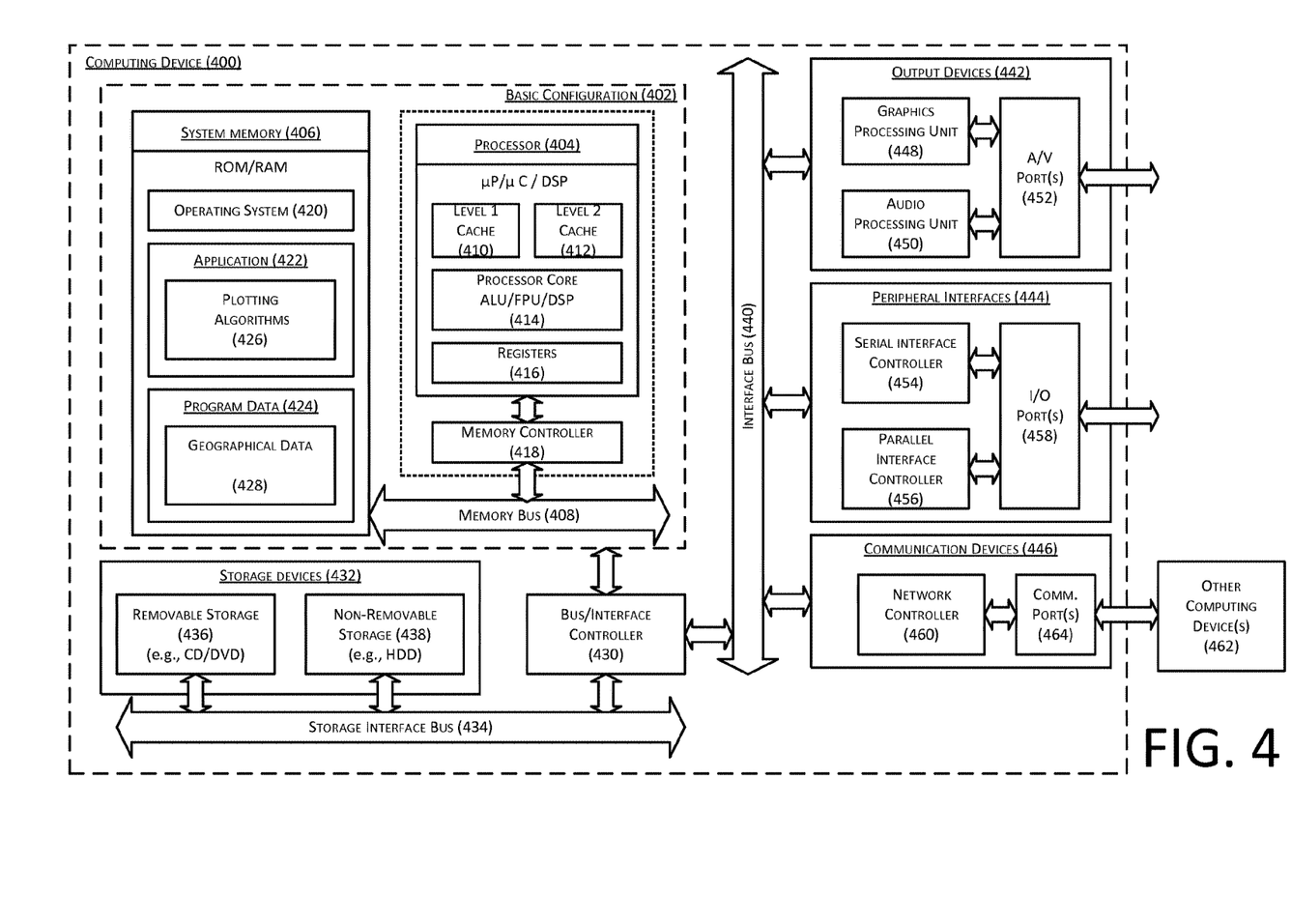
FIG. 4 shows a block diagram illustrating an example computing device by which various example solutions described herein may be implemented, arranged in accordance with at least some embodiments described herein.

FIG. 4 shows a block diagram illustrating an example computing device by which various example solutions described herein may be implemented, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include one or more plotting and calculating algorithms 426 that may be arranged to perform the functions as described herein including those described with respect to processing flow 300 of FIG. 3. Program data 424 may include geographical data 428 that may be utilized for the real-time traffic comparisons performed by the plotting and calculating algorithms 426 as described herein. Geographical data 428 may include lane configurations of road 112. In some embodiments, application 422 may be arranged to operate with program data 424 on operating system 420 such that refined GPS data may be provided, as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 544 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.; and a transmission type medium such as a digital and/or an analog communication medium, e.g., a fiber optic cable, a waveguide, a wired communication link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing location and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method of location refinement, the method comprising:
   aggregating global positioning system (GPS) data, received from each of multiple devices that are proximately located relative to at least one other of the multiple devices, over a period of time;
   estimating a location for each of the multiple devices at intervals during the period of time based on, at least, the aggregated GPS data;
   determining a current location for each of the multiple devices based on a trend of the estimated locations for a respective device, for each of the multiple devices over the period of time;
   refining the determined current location of a vehicle that corresponds to a particular one of the multiple devices, relative to a road, by comparing the determined current location for each of the multiple devices.

2. The method of claim 1, wherein the method is executed by a server.

3. The method of claim 1, wherein each of the multiple devices is located within a predetermined distance of the at least one other of the multiple devices.

4. The method of claim 1, wherein each of the multiple devices is disposed in a corresponding vehicle on the road.

5. The method of claim 1, wherein the refined location of the vehicle includes an indication on which lane of the road, the vehicle is currently located.

6. The method of claim 5, further comprising:
   informing the particular one of the multiple devices of the refined location of the vehicle.

7. The method of claim 5, further comprising:
   mapping relative refined locations of multiple vehicles that respectively correspond to one or more of the multiple devices.

8. A system to produce refined location information for multiple vehicles, the system comprising:
   multiple devices, disposed with respectively corresponding vehicles, each configured to record GPS coordinates at multiple intervals over a period of time; and
   a server configured to:
      aggregate GPS coordinates collected from each of the multiple devices over the period of time, estimate a location for each of the multiple devices at the multiple intervals during the
      period of time, track locations for each of the multiple devices over the period of time,
      determine a current location, on a road, of a vehicle corresponding to each of the multiple devices based on a detected trend of the tracked locations for a respective device, for each of the multiple devices over the period of time, wherein the determined current location includes an indication on which lane on the road, the vehicle, that corresponds to each of the multiple devices, is currently located and transmit the current location, at least relative to the road, to at least one of the multiple devices that corresponds to one of the multiple vehicles.

9. The system of claim 8, wherein the server is further configured to collect the GPS coordinates that are transmitted from each of the multiple devices to the server.

10. The system of claim 8, wherein the server is further configured to collect the GPS coordinates that are stored on each of the multiple devices.

11. The system of claim 8, wherein the server is further configured to generate a map that includes the determined current location of each of the multiple vehicles that corresponds to each of the multiple devices, relative to each other.

12. The system of claim 8, wherein the server is further configured to:
   refine the determined current location of the vehicle that corresponds to each of the multiple devices, relative to the road, by comparing the determined current location for each of the multiple devices.

13. The system of claim 12, wherein the refined current location of the vehicle that corresponds to each of the multiple devices includes an indication on which lane of the road, the vehicle is currently located.

14. A method of location refinement, the method comprising:
   aggregating data pertaining to each of multiple devices that are proximately located relative to each other, over a period of time;
   estimating a location for each of the multiple devices at intervals during the period of time;
   determining a current location for each of the multiple devices based on a trend of estimated locations for the respective devices, for each of the multiple devices over the period of time; and
   refining the determined current location of each of the multiple devices, relative to each other, by comparing the determined current location for each of the multiple devices.

15. The method of claim 14, wherein the data pertaining to each of the multiple devices includes an IP address.

* * * * *